United States Patent
Chen

(10) Patent No.: US 9,877,283 B2
(45) Date of Patent: Jan. 23, 2018

(54) METHOD AND TERMINAL FOR REPORTING SENSOR DATA AND TERMINAL

(71) Applicant: Huawei Device Co., Ltd., Shenzhen (CN)

(72) Inventor: Lei Chen, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/902,107

(22) PCT Filed: Jul. 14, 2014

(86) PCT No.: PCT/CN2014/082151
§ 371 (c)(1),
(2) Date: Dec. 30, 2015

(87) PCT Pub. No.: WO2015/081700
PCT Pub. Date: Jun. 11, 2015

(65) Prior Publication Data
US 2016/0278014 A1    Sep. 22, 2016

(30) Foreign Application Priority Data
Dec. 2, 2013  (CN) .......................... 2013 1 0634969

(51) Int. Cl.
*H04W 52/02* (2009.01)
*G06F 1/32* (2006.01)
(Continued)

(52) U.S. Cl.
CPC ...... *H04W 52/0229* (2013.01); *G06F 1/3293* (2013.01); *H04L 67/125* (2013.01);
(Continued)

(58) Field of Classification Search
CPC ................ H04L 67/125; H04W 4/005; H04W 52/0229; H04W 52/0293; H04W 52/0235; G06F 1/3293; Y02B 60/50
See application file for complete search history.

(56) References Cited

U.S. PATENT DOCUMENTS

| | | | |
|---|---|---|---|
| 2012/0023353 A1 | 1/2012 | Lee et al. | |
| 2012/0144017 A1* | 6/2012 | Singh | G06F 1/3206 709/224 |

(Continued)

FOREIGN PATENT DOCUMENTS

| | | |
|---|---|---|
| CN | 102893257 A | 1/2013 |
| CN | 103007534 A | 4/2013 |

(Continued)

*Primary Examiner* — Jae Y Lee

(57) ABSTRACT

A method and a terminal for reporting sensor data are provided. The method for reporting sensor data includes: when a processor needs to process only sensor data collected by a sensor, sending, by the processor, an indication that the processor is to enter a sleep state, and entering the sleep state; after the processor enters the sleep state, receiving and temporarily storing, by a sensor hub, the sensor data collected and reported by the sensor into an event information table, recording, by the sensor hub, corresponding time at which the sensor collects the sensor data, and further temporarily storing the time into the event information table; and when the processor is restored to a working state, reporting, by the sensor hub, the event information table to the processor, so that the processor parses the event information table to complete corresponding processing.

9 Claims, 4 Drawing Sheets

(51) Int. Cl.
*H04L 29/08* (2006.01)
*H04W 4/00* (2009.01)

(52) U.S. Cl.
CPC ....... *H04W 4/005* (2013.01); *H04W 52/0235* (2013.01); *H04W 52/0293* (2013.01); *Y02B 60/121* (2013.01); *Y02B 60/50* (2013.01)

(56) References Cited

U.S. PATENT DOCUMENTS

| | | | |
|---|---|---|---|
| 2012/0254878 A1 | 10/2012 | Nachman et al. | |
| 2013/0165181 A1* | 6/2013 | Hasegawa | G06F 1/324 455/556.1 |
| 2013/0244686 A1* | 9/2013 | Saha | G06F 1/3206 455/456.1 |

FOREIGN PATENT DOCUMENTS

| | | |
|---|---|---|
| CN | 103176506 A | 6/2013 |
| CN | 103619056 A | 3/2014 |

\* cited by examiner

METHOD AND TERMINAL FOR REPORTING SENSOR DATA AND TERMINAL

CROSS REFERENCE TO RELATED APPLICATIONS

The present application claims priority under 35 U.S.C. § 365 to International Patent Application No. PCT/CN2014/082151 filed Jul. 14, 2014. International Patent Application No. PCT/CN2014/082151 claims priority under 35 U.S.C. § 365 and/or 35 U.S.C. § 119(a) to Chinese Patent Application No. 201310634969.X filed Dec. 2, 2013 and which are incorporated herein by reference into the present disclosure as if fully set forth herein.

TECHNICAL FIELD

Embodiments of the present invention relate to the field of electronic technologies, and in particular, to a method and a terminal for reporting sensor data.

BACKGROUND

Nowadays, intelligent terminals such as smartphones and tablet computers develop rapidly. There are multiple sensors installed in the intelligent terminals, such as a gravity sensor, a gyroscope, an infrared proximity inductive sensor, a compass, and a pressure-inductive sensor. In addition, with the further development of terminal intellectualization, a quantity of sensors may further increase. Data collected by these sensors may be used by different application programs to implement specific functions, for example, a pedometer needs to invoke data of a vibration sensor.

In this process, once detecting that an event occurs, a sensor reports event information to a driver layer of a processor. Then, the driver layer sends the event information to an application program, and the application program completes corresponding processing. In order that sensor information sent to the application program is not lost, the processor keeps in a wake (wake) state, which causes extremely high power consumption.

FIG. 1 is a flowchart of a method of reporting sensor data in real time in the prior art. When an event occurs, the following steps are performed:

101. A sensor collects and reports sensor data.

102. A processor receives and processes the sensor data.

In a procedure shown in FIG. 1, because the processor needs to receive sensor data as long as the sensor data exists, and needs to process the sensor data as long as the sensor data is received, the processor needs to keep in a wake state, which causes extremely high power consumption.

SUMMARY

In view of this, embodiments of the present invention provide a method and a terminal for reporting sensor data, so as to resolve a problem of extremely high power consumption because a processor needs to keep in a wake state.

According to a first aspect, a method for reporting sensor data is provided, including:

when a processor determines that only sensor data collected by a sensor needs to be processed currently, sending, by the processor, an indication indicating that the processor is to enter a sleep state, and entering the sleep state;

receiving and temporarily storing, by a sensor hub after receiving the indication indicating that the processor is to enter the sleep state, the sensor data collected and reported by the sensor; and when the processor is restored to a working state, sending an indication indicating that the processor is restored to the working state, and reporting, by the sensor hub, the sensor data to the processor after receiving the indication indicating that the processor is restored to the working state.

In a first possible implementation manner of the first aspect, the receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

With reference to the first possible implementation manner of the first aspect, in a second possible implementation manner, that the processor determines that only the sensor data collected by the sensor needs to be processed currently specifically includes: identifying identification information of an interaction party interacting with the processor, and when the identified identification information includes only identification information of the sensor, determining, by the processor, that only the sensor data collected by the sensor needs to be processed currently.

With reference to the first or the second possible implementation manner of the first aspect, in a third possible implementation manner, the entering, by the processor, the sleep state includes: disconnecting a clock and a power source of the processor.

With reference to any one of the first to the third possible implementation manners of the first aspect, in a fourth possible implementation manner, that the processor is restored to the working state includes: customizing a condition under which the sensor hub wakens the processor, and when the sensor hub determines that the wakening condition is met, wakening the processor.

With reference to the fourth possible implementation manner of the first aspect, in a fifth possible implementation manner, the condition includes at least one of the following:

an amount of data in the event information table exceeds a specific value; and duration in which the processor is in the sleep state exceeds a specific value.

With reference to any one of the first to the fifth possible implementation manners of the first aspect, in a sixth possible implementation manner, the method further includes: receiving and parsing, by the processor, the event information table reported by the sensor hub, so as to obtain the sensor data and a set of the corresponding time at which the sensor collects the sensor data.

With reference to any one of the first to the fifth possible implementation manners of the first aspect, in a seventh possible implementation manner, the processor receives and parses the event information table reported by the sensor hub, so as to acquire the sensor data and record time at which the sensor data is acquired, where the time is acquiring time; and calculates, according to the acquiring time in a manner of time mapping, the corresponding time at which the sensor collects the sensor data.

With reference to the seventh possible implementation manner of the first aspect, in an eighth possible implementation manner, when the event information table is an event queue, the manner of time mapping includes the following:

the working state of the processor includes a compression working state, and in the compression working state, the processor needs to acquire sensor data that is temporarily stored by the sensor hub when the processor is in the sleep state and the compression working state;

the processor calculates sleep duration $T_1$ from time at which the processor enters the sleep state to time at which the processor enters the compression working state, where a starting moment at which the processor enters the sleep state is $T_{10}$; and the processor calculates duration $T_2$ from the time at which the processor enters the compression working state to time at which the compression working state ends, where a starting moment at which the processor enters the compression working state is $T_{20}$; and the processor adjusts a system time interface, so that when the processor acquires sensor data at acquiring time $T_{20}+\tau$, corresponding time that is read by the system time interface and at which the sensor collects the sensor data is $T_{10}+\tau*(T_1+T_2)/T_2$, where $\tau$ indicates a duration variable starting from the compression working state, and when $\tau$ is the largest, the compression working state ends ($0 \leq \tau \leq T_2$).

According to a second aspect, a method for reporting sensor data is provided, where the method includes:

when a processor determines that only sensor data collected by a sensor needs to be processed currently, sending, by the processor, indication information indicating that the processor is to enter a sleep state, and entering the sleep state, where the indication information indicating that the processor is to enter the sleep state is used to enable a unit for temporarily storing sensor data to receive and temporarily store, after receiving the indication information indicating that the processor is to enter the sleep state, the sensor data collected by the sensor; and when the processor is restored to a working state, sending indication information indicating that the processor is restored to the working state, where the indication information indicating that the processor is restored to the working state is used to enable the unit for temporarily storing sensor data to report the temporarily stored sensor data to the processor after receiving the indication information indicating that the processor is restored to the working state.

In a first possible implementation manner of the second aspect, the receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

According to a third aspect, a terminal is provided, including: a sensor, a processor, and a sensor hub, where:

the sensor is configured to collect sensor data;

the processor is configured to: when it is determined that only the sensor data collected by the sensor needs to be processed currently, send indication information indicating that the processor is to enter a sleep state, and enter the sleep state; and when the processor is restored to a working state, send indication information indicating that the processor is restored to the working state, and receive the sensor data reported by the sensor hub; and the sensor hub is connected between the sensor and the processor, and is configured to: after receiving the indication indicating that the processor is to enter the sleep state, receive and temporarily store the sensor data collected by the sensor, and after receiving the indication indicating that the processor is restored to the working state, report the sensor data to the processor.

In a first possible implementation manner of the third aspect, the receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

With reference to the third aspect or the first possible implementation manner of the third aspect, in a second possible implementation manner, the sensor hub further includes:

a determining unit, configured to check whether a wakening condition of the processor is met, and if the wakening condition is met, waken the processor, so that the processor is restored from the sleep state to the working state.

With reference to the second possible implementation manner of the third aspect, in a third possible implementation manner, the wakening condition includes at least one of the following:

an amount of data temporarily stored in the event information table exceeds a specific value; and duration in which the processor is in the sleep state exceeds a specific value.

With reference to any one of the first to the third possible implementation manners of the second aspect, in a fourth possible implementation manner, the processor includes:

a receiving unit, configured to receive the event information table reported by the sensor hub; and a processing unit, configured to parse the event information table received by the receiving unit.

With reference to the fourth possible implementation manner of the second aspect, in a fifth possible implementation manner, the processing unit parses out the sensor data and a set of the corresponding time at which the sensor collects the sensor data, and processes the sensor data.

With reference to the fourth possible implementation manner of the second aspect, in a sixth possible implementation manner, the processing unit parses out the sensor data and records time at which the sensor data is acquired, where the time is acquiring time; and the processor calculates, according to the acquiring time in a manner of time mapping, the corresponding time at which the sensor collects the sensor data.

With reference to the sixth possible implementation manner of the second aspect, in a seventh possible implementation manner, when the event information table is an event queue, the manner of time mapping includes the following:

the working state includes a compression working state, and in the compression working state, the processor needs to acquire sensor data that is temporarily stored by the sensor hub when the processor is in the sleep state and the compression working state;

the processor calculates sleep duration $T_1$ from time at which the processor enters to time at which the processor enters the compression working state, where a starting moment at which the processor enters the sleep state is $T_{10}$;

the processor calculates duration $T_2$ from the time at which the processor enters the compression working state to time at which the compression working state ends, where a starting moment at which the processor enters the compression working state is $T_{20}$; and the processor adjusts a system time interface, so that when the processor acquires sensor data at acquiring time $T_{20}+\tau$, corresponding time that is read by the system time interface and at which the sensor collects the sensor data is $T_{10}+\tau^*(T_1+T_2)/T_2$, where $\tau$ indicates a duration variable starting from the compression working state, and when $\tau$ is the largest, the compression working state ends ($0 \leq \tau \leq T_2$).

According to a fourth aspect, a processor is provided, where the processor is configured to: when it is determined that only sensor data collected by a sensor needs to be processed currently, send indication information indicating that the processor is to enter a sleep state, and enter the sleep state, where the indication information indicating that the processor is to enter the sleep state is used to enable a unit for temporarily storing sensor data to receive and temporarily store, after receiving the indication information indicating that the processor is to enter the sleep state, the sensor data collected by the sensor; and when the processor is restored to a working state, send indication information indicating that the processor is restored to the working state, where the indication information indicating that the processor is restored to the working state is used to enable the unit for temporarily storing sensor data to report the temporarily stored sensor data to the processor after receiving the indication information indicating that the processor is restored to the working state.

In a first possible implementation manner of the fourth aspect, the receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

According to the foregoing solutions, when a processor needs to process only sensor data collected by a sensor, the processor can enter a sleep state, a sensor hub with low power consumption temporarily stores, into the sensor hub, the data collected by the sensor, and after the processor is restored to a working state, the sensor hub reports the temporarily stored data collected by the sensor, and then the processor processes the sensor data. In this way, the processor with high power consumption does not need to keep in the working state when only the sensor is working, thereby reducing power consumption.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technical solutions in the present invention may be applied to various mobile or fixed terminals that need to use sensors, such as a mobile phone and a tablet computer.

Figure 1:
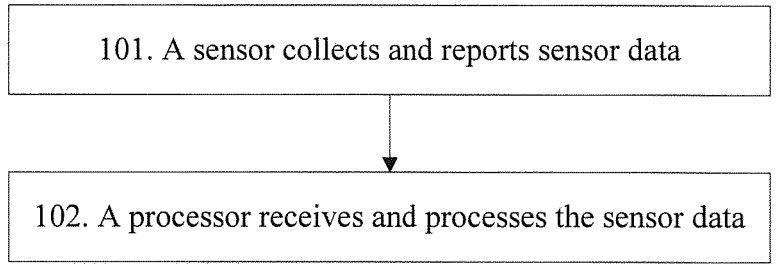
FIG. 1 is a schematic flowchart of a method of reporting sensor data in real time in the prior art.
Figure 2:
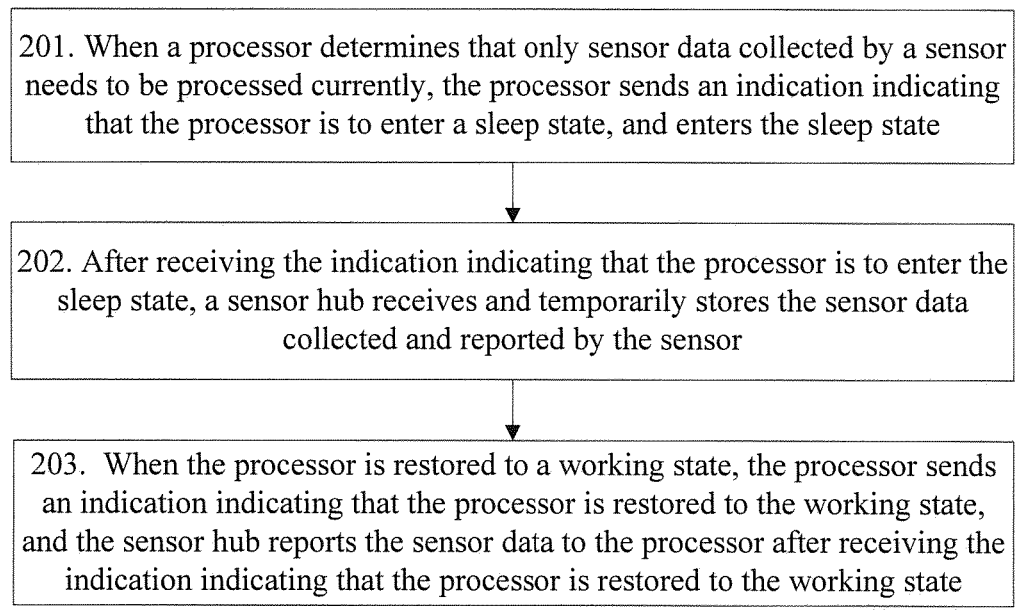
FIG. 2 is a schematic flowchart of a method of reporting sensor data according to an embodiment of the present invention.

FIG. 2 is a schematic flowchart of a method of reporting sensor data according to an embodiment of the present invention.

201. When a processor determines that only sensor data collected by a sensor needs to be processed currently, the processor sends an indication indicating that the processor is to enter a sleep state, and enters the sleep state.

Specifically, the sensor includes a gravity sensor, a gyroscope, a light-sensitive sensor, a sound-sensitive sensor, a gas-sensitive sensor, a chemical sensor, a pressure-sensitive sensor, and the like, where the sensor may be a dedicated sensor or may be another device with a sensor function, which is not limited in the present invention.

It should be understood that the processor may determine whether only the sensor data collected by the sensor needs to be processed. Optionally, that the processor determines that only the sensor data collected by the sensor needs to be processed currently includes: identifying identification information of an interaction party interacting with the processor, where when the identified identification information includes only identification information of the sensor, the processor considers that only the sensor data collected by the sensor needs to be processed. The interaction herein includes data interaction, signaling communication, or the like that occurs between any unit, module, or application and the processor; the interaction party herein includes any unit, module, or application mentioned above, and in an interaction process, interaction information includes at least identification information (ID information) of the interaction party, based on which the processor can identify an identity of the interaction party according to the ID information. When the interaction party includes only the sensor, the processor considers that only the sensor data collected by the sensor needs to be processed, and then the processor enters the sleep state; and when the interaction party is a unit, a module, or an application except the sensor, the processor may keep in a working state.

That the processor enters the sleep state may indicate that a power source and a clock of the processor are disconnected. It may be understood that if the processor includes a power management module, the module does not need to be powered off, so as to facilitate a hot start of the processor. Optionally, when the processor enters the sleep state from the working state, the processor stores, into a memory, configurations and state restoration functions of registers of the processor and each unit, module, application, or the like that interacts with the processor, where entry addresses of the state restoration functions are stored in the power management module, and the power management module still keeps working when the processor enters the sleep state, and can accurately find the state restoration functions from the entry addresses of the state restoration functions. In addition, the configurations of the registers include information such as a configuration of a clock and a pointer of a task. When the processor enters the working state from the sleep state, the processor invokes the entry addresses of the state restoration functions to acquire the state restoration functions, so as to restore the configurations, before the processor enters the sleep state, of the processor and each unit, module, or application that interacts with the processor. In the prior art, during working, the sensor reports collected sensor data to the processor in real time; therefore, even if only the sensor is working, the processor needs to keep in the working state. However, in the technical solution provided in this embodiment of the present invention, the processor can enter the sleep state in a case in which only the sensor collects sensor data, which definitely reduces corresponding power consumption.

That the processor sends the indication indicating that the processor is to enter the sleep state may be specifically that: the processor sends an instruction, where the instruction indicates that the processor is to enter the sleep state. The instruction may be sent by the processor to all units controlled by the processor; therefore, all these units can receive the instruction sent by the processor.

202. After receiving the indication indicating that the sensor is to enter the sleep state, a sensor hub (Sensor Hub, also referred to as sensor center) receives and temporarily stores the sensor data collected and reported by the sensor.

That the sensor hub receives and temporarily stores the sensor data collected and reported by the sensor specifically includes: receiving and temporarily storing the sensor data collected by the sensor into an event information table, recording corresponding time at which the sensor collects the sensor data, and further temporarily storing the time into the event information table.

It should be understood that the foregoing sensor hub is connected between the sensor and the processor, that is, first the sensor collects the sensor data and then reports the sensor data to the sensor hub, and then the sensor hub reports the sensor data to the processor. The sensor hub is connected to one or more same or different sensors, where the connection manner may be wired or may be wireless. Compared with the processor, the foregoing sensor hub is equivalent to a processor with low power consumption, and the sensor hub can be obtained from the market.

When the processor is working, the sensor hub reports received sensor data to the processor in real time; but when the processor is in the sleep state, the sensor hub temporarily stores the received sensor data, and records time at which the sensor data is received. Because the sensor always reports the collected sensor data to the sensor hub in real time, the time at which the sensor hub receives the sensor data is collecting time.

That the sensor hub receives and temporarily stores, after receiving the indication indicating that the sensor is to enter the sleep state, the sensor data collected and reported by the sensor specifically includes that: after receiving the indication indicating that the processor is to enter the sleep state, the sensor hub returns a response message to the processor and starts to store the received sensor data.

It should be noted that the foregoing sensor hub temporarily stores the sensor data and the collecting time into the event information table of the sensor hub, where the event information table includes at least two kinds of operations: a push (push) operation and a pop (pop) operation. The sensor data and the collecting time are successively pushed into the event information table according to a time sequence; during data popping, there are different popping sequences according to a property of the event information table. For example, when the event information table is in a queue (queue) form, a "first in first out" sequence is followed, and when the event information table is in a stack (stack) form, a "first in last out" sequence is followed. Certainly, the event information table may also use a linked list (Linked List) or another data structure. Exemplarily, a field that may be created in the event information table is a data field, where the field is corresponding to stored sensor data, and there is no limitation on a format or a length of the field; and another created filed is a time field, where the field is corresponding to stored collecting time. Because there is a correspondence between sensor data and collecting time, a corresponding association between a data field and a time field can be established by creating a same information header, or a corresponding association between sensor data and collecting time exists by extending content of a time filed after a data filed. In specific implementation, a form of a data structure, an algorithm manner, and the like may be determined by persons skilled in the art by themselves, which are not limited in the present invention.

203. When the processor is restored to a working state, the processor sends an indication indicating that the processor is restored to the working state, and the sensor hub reports the sensor data to the processor after receiving the indication indicating that the processor is restored to the working state.

The reporting the sensor data to the processor specifically includes: reporting the event information table to the processor.

That when the processor is restored to the working state, the processor sends the indication indicating that the processor is restored to the working state specifically includes that: when the processor is restored to the working state, the processor sends an instruction to notify that the processor has been restored to the working state. The instruction may be sent by the processor to all the units controlled by the processor; therefore, all these units can receive the instruction sent by the processor.

After receiving the indication indicating that the processor is restored to the working state, the sensor hub determines that the processor has been restored to the working state, and reports the event information table to the processor.

It should be understood that a factor that triggers the processor to be restored to the working state includes a case in which the sensor hub wakens the processor, or another unit, module, application, or the like wakens the processor (for example, a user wants to look at the time of a terminal when the processor is in the sleep state).

In a case in which another unit, module, application, or the like wakens the processor, the processor is restored to the working state, and first the processor sends a piece of information to the sensor hub, and then the sensor hub reports the event information table to the processor.

It should be understood that when there is no other factor that triggers the processor to be restored to the working state, the foregoing sensor hub may waken the processor at proper time (for example, in a case in which the event information table of the sensor hub is full).

Optionally, a condition under which the sensor hub wakens the processor may be customized, where the foregoing wakening condition includes the following one or more conditions: An amount of data in the foregoing event information table exceeds a specific value, or duration in which the processor is in the sleep state exceeds a specific value. When the wakening condition is met, the sensor hub wakens the processor.

Further, after the event information table is reported, step 204 may further be performed (this step is not shown in the figure): The processor parses the event information table.

It should be noted that the event information table includes the sensor data and the collecting time.

Figure 3:
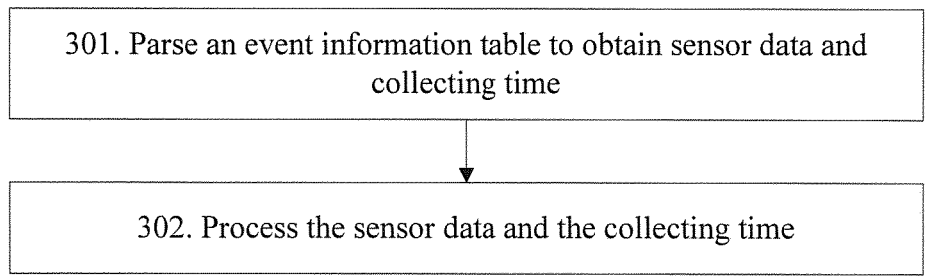
FIG. 3 is a schematic flowchart of a method of processing sensor data by a processor according to an embodiment of the present invention.

If the processor can parse out the sensor data and the collecting time, processing steps (referring to FIG. 3) of the processor are as follows:

301. Parse the event information table to obtain the sensor data and the collecting time.

302. Process the sensor data and the collecting time.

However, because of an interface protocol standard between an application program and a driver layer, an existing processor possibly cannot parse out the collecting time from the event information table; therefore, how to calculate the collecting time in another manner is introduced in the following embodiment of the present invention, so that the processor completes corresponding processing.

According to the method provided in this embodiment of the present invention, a processor with high power consumption enters a sleep state in a case in which only a sensor is working, a sensor hub with low power consumption replaces the processor to temporarily store sensor data, and after the processor is restored to a working state, the sensor hub reports the data to the processor, so that the processor with high power consumption does not need to keep in the working state when only the sensor is working, thereby reducing power consumption.

Figure 4:
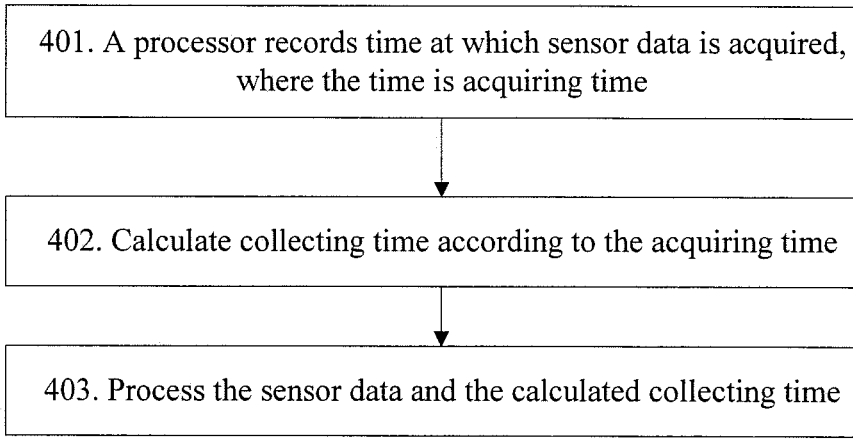
FIG. 4 is another schematic flowchart of a method of processing sensor data by a processor according to an embodiment of the present invention.

When the processor can obtain only the sensor data but cannot obtain the collecting time by parsing the event information table, FIG. 4 provides another schematic flowchart of a method of processing reported sensor data by a processor.

A part in this embodiment of the present invention that is the same as that in the foregoing embodiment is not described herein again, and a difference lies in that the processor needs to acquire collecting time in a manner of time mapping.

Specifically, the following steps are included:

401. The processor records time at which sensor data is acquired from an event information table, where the time is acquiring time. It may be understood that the acquiring time is different from the collecting time described above, where the collecting time is time that is corresponding to time at which the sensor collects the sensor data in a one-to-one manner, and is time at which an event actually occurs; and the acquiring time is time at which the processor acquires, by means of parsing, the sensor data from the event information table, and has no correspondence with the collecting time.

402. Calculate the collecting time according to the acquiring time.

As described above, the acquiring time is the time at which the processor parses out the sensor data from the event information table. When the collecting time cannot be directly obtained after the event information table is parsed, one method is to establish a correspondence between the acquiring time and the collecting time, so as to calculate the collecting time by using the acquiring time.

403. Process the sensor data and the calculated collecting time.

According to the method provided in this embodiment of the present invention, in a case in which a processor acquires only sensor data by means of parsing, the sensor data is analyzed and processed by using collecting time that is calculated according to acquiring time.

Figure 5:
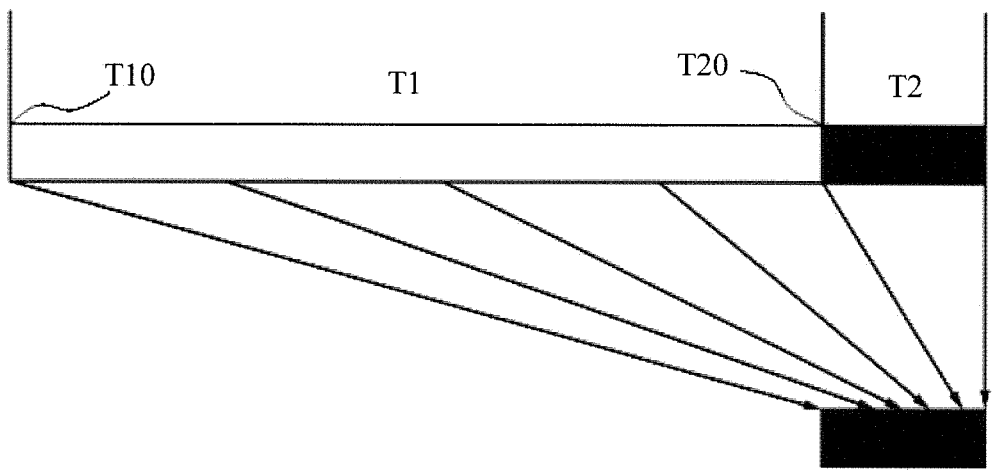
FIG. 5 is a schematic diagram of a method of establishing a correspondence between acquiring time and collecting time in a manner of time mapping according to an embodiment of the present invention.

Optionally, FIG. 5 provides a schematic diagram of a method for calculating collecting time according to acquiring time. When an event information table is in a queue form, collecting time may be acquired according to acquiring time in a manner of time mapping provided in an embodiment of the present invention.

Specifically, after a processor is restored to a working state, sensor data that occurs when the processor is in a sleep state is processed in a period of time, and it is defined that the processor is in a compression working state in this period of time. In the compression working state, on the one hand, a sensor hub needs to temporarily store sensor data that occurs during the compression working state, and on the other hand, the sensor hub needs to report sensor data that is temporarily stored when the processor is in the sleep state to the processor. When the sensor hub completely reports an event information table that is temporarily stored when the processor is in the sleep state, the sensor hub then reports an event information table that is temporarily stored during the compression working state to the processor. When the processor receives all event information tables that are temporarily stored by the sensor hub when the processor is in the sleep state and in the compression working state, the processor ends the compression working state, is restored to a common working state, and processes, in real time, sensor data reported by a sensor. The following provides description with reference to FIG. 5.

The processor calculates sleep duration $T_1$ from time at which the processor enters the sleep state to time at which the processor enters the compression working state, where a starting moment at which the processor enters the sleep state is $T_{10}$; and the processor calculates duration $T_2$ from the time at which the processor enters the compression working state to time at which the compression working state ends, where a starting moment at which the processor enters the compression working state is $T_{20}$.

The sensor hub reports, during $T_2$ when the processor is in the compression working state, an event information table within $T_1+T_2$ to the processor, and the processor acquires sensor data by parsing the event information table. It may be understood that a current processing speed of the processor is very fast, and almost once data is reported, the data can be rapidly parsed; therefore, it may be considered that once the sensor hub completely reports the event information table with $T_2$, the processor can completely parse all data in the event information table within $T_2$.

Within $T_2$, the processor adjusts a system time interface, so that when the processor acquires sensor data at acquiring time $T_{20}+\tau$, a moment that is read by the system time interface is $T_{10}+\tau^*(T_1+T_2)/T_2$, where $\tau$ indicates a duration variable starting from the compression working state, and when $\tau$ is the largest, the compression working state ends ($0\leq\tau\leq T_2$).

According to this embodiment of the present invention, a processor can calculate collecting time according to acquiring time in a manner of time compression, that is, although the processor acquires sensor data at $T_{20}+\tau$, the time may be considered as $T_{10}+\tau^*(T_1+T_2)/T_2$, that is, time at which the sensor data is actually collected, so that the processor can process the sensor data and calculate a collecting time set in a case in which only the sensor data and the acquiring time are obtained.

A method for reporting sensor data according to an embodiment of the present invention includes:

when a processor determines that only sensor data collected by a sensor needs to be processed currently, sending, by the processor, indication information indicating that the processor is to enter a sleep state, and entering the sleep state, where the indication information indicating that the processor is to enter the sleep state is used to enable a unit for temporarily storing sensor data to receive and temporarily store, after receiving the indication information indicating that the processor is to enter the sleep state, the sensor data collected by the sensor; and sending, when the processor is restored to a working state, indication information indicating that the processor is restored to the working state, where the indication information indicating that the processor is restored to the working state is used to enable the unit for temporarily storing sensor data to report the temporarily stored sensor data to the processor after receiving the indication information indicating that the processor is restored to the working state.

The receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

The unit for temporarily storing sensor data may be a sensor hub, and after receiving the indication indicating that the sensor is to enter the sleep state, the sensor hub receives and temporarily stores the sensor data collected by the sensor.

The sending, by the processor, an indication indicating that the processor is to enter a sleep state may be specifically: sending, by the processor, an instruction, where the instruction indicates that the processor is to enter the sleep state. The instruction may be sent by the processor to all units controlled by the processor; therefore, all these units can receive the instruction sent by the processor.

The sending, when the processor is restored to a working state, an indication indicating that the processor is restored to the working state specifically includes: when the processor is restored to the working state, sending an instruction to notify that the processor has been restored to the working state. The instruction may be sent by the processor to all units controlled by the processor; therefore, all these units can receive the instruction sent by the processor.

After receiving the indication indicating that the processor is restored to the working state, the sensor hub determines that the processor has been restored to the working state, and reports the event information table to the processor.

Figure 6:
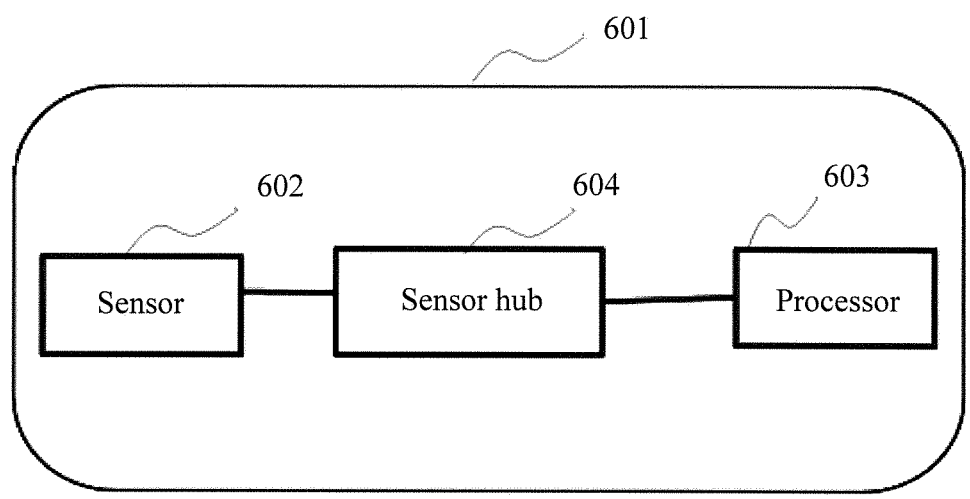
FIG. 6 is a schematic structural diagram of a terminal according to an embodiment of the present invention.

FIG. 6 is a schematic structural diagram of a terminal capable of reporting sensor data according to an embodiment of the present invention.

The terminal 601 includes: a sensor 602, configured to collect sensor data; a processor 603, configured to: when it is determined that only the sensor data collected by the sensor 602 needs to be processed currently, send an indication indicating that the processor is to enter a sleep state, and enter the sleep state, and when the processor is restored to a working state, send an indication indicating that the processor is restored to the working state, and receive an event information table reported by a sensor hub 604; and the sensor hub 604, which is connected between the sensor 602 and the processor 603, and is configured to: after receiving the indication indicating that the processor is to enter the sleep state, receive and temporarily store the sensor data collected by the sensor 602 into the event information table, record time at which the sensor 602 collects the sensor data, and temporarily store the time into the event information table, and after receiving the indication indicating that the processor 603 is restored to the working state, report the event information table to the processor 603.

Specifically, the foregoing sensor may be a gravity sensor, a gyroscope sensor, an infrared sensor, a chemical sensor, a pressure-sensitive sensor, or the like; may be a dedicated sensor; or may be another device with a sensor function, which is not limited in the present invention.

It should be understood that there are many factors that trigger the processor 603 to be restored to the working state, including a case in which the sensor hub 604 wakens the processor, or another unit, module, application, or the like wakens the processor (for example, a user wants to look at the time of the terminal when the processor is in the sleep state).

It should be noted that because of an interface protocol standard between an application program and a driver layer, a processor using an existing interface protocol standard possibly cannot parse out collecting time from a received event information table; and henceforth, by modifying the interface protocol standard between the application program and the driver layer, the processor can parse out the sensor data and the collecting time after receiving the event information table, so as to improve efficiency of the processor.

According to the terminal provided in this embodiment of the present invention, a processor can enter a sleep state in a case in which only sensor data needs to be processed, a sensor hub with low power consumption replaces the processor to temporarily store the sensor data, and after the processor is restored to a working state, the sensor hub reports an event information table to the processor, so that the processor with high power consumption does not need to keep in the working state when a sensor is working, thereby reducing power consumption.

Figure 7:
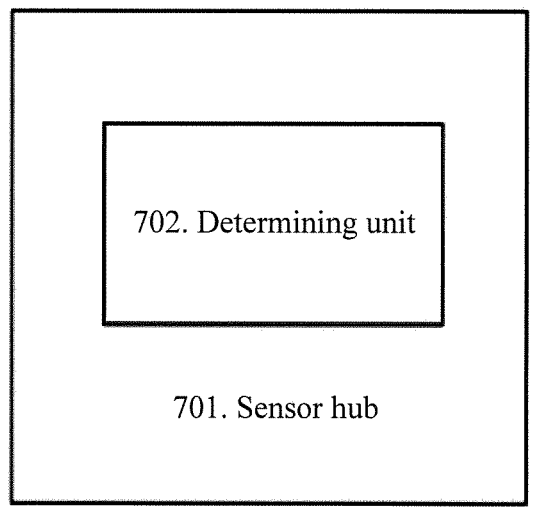
FIG. 7 is a schematic block diagram of an internal structure of a sensor hub according to an embodiment of the present invention.

Optionally, as another embodiment (referring to FIG. 7), a sensor hub 701 includes:

a determining unit 702, configured to check whether a wakening condition of the processor is met, where if the wakening condition is met, waken the processor, so that the processor is restored to the working state from the sleep state, or if the wakening condition is not met, does not waken the processor, so that the processor keeps in the sleep state.

Optionally, the wakening condition includes the following one or more conditions: an amount of data temporarily stored in the event information table exceeds a specific value, or duration in which the processor is in the sleep state exceeds a specific value.

Figure 8:
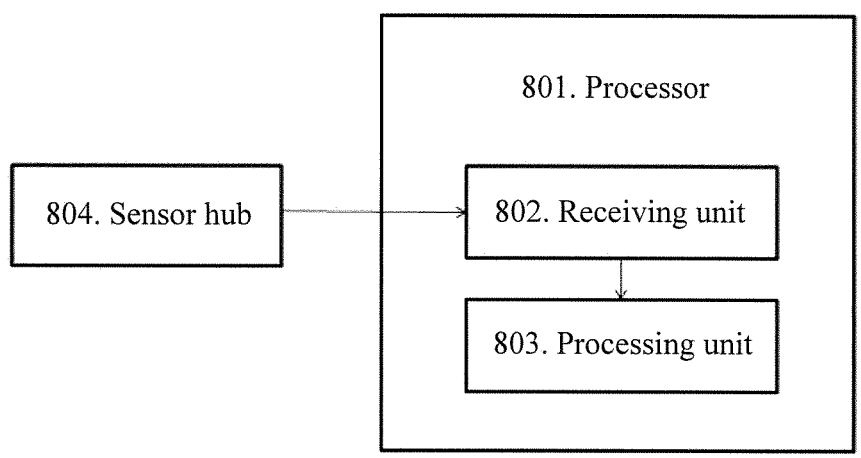
FIG. 8 is a schematic diagram of a connection relationship between a sensor hub and an internal unit of a processor according to an embodiment of the present invention.

Optionally, as another embodiment (referring to FIG. 8), a processor 801 includes:

a receiving unit 802, configured to receive the event information table reported by a sensor hub 804; and a processing unit 803, configured to parse the event information table received by the receiving unit 802.

The processing unit 803 is further configured to parse out the sensor data and a set of collecting time corresponding to the sensor data, and process the sensor data; or the processing unit 803 is further configured to parse out the sensor data, and acquire, in a manner of time mapping, corresponding time at which the sensor collects the sensor data.

Exemplarily, when the event information table is in a queue form, the manner of time mapping includes the following: After the processor is restored to the working state, the processor first keeps in a compression working state for a period of time. In the compression working state, on the one hand, the sensor hub needs to temporarily store an event information table that occurs during the compression working state, and on the other hand, the sensor hub needs to report an event information table that is temporarily stored when the processor is in the sleep state. When the sensor hub completely reports the event information table that is temporarily stored when the processor is in the sleep state, the sensor hub then reports the event information table that is temporarily stored during the compression working state to the processor for parsing and processing. For a specific calculation method, reference may be made to a process in the method embodiment, and details are not described again.

According to the foregoing solutions, a terminal may enter a sleep state when a processor needs to process only sensor data, a sensor hub with low power consumption replaces the processor to temporarily store the sensor data, and after the processor is restored to a working state, the sensor hub reports the data to the processor, so that the processor with high power consumption does not need to keep in the working state when a sensor is working, thereby reducing power consumption.

A processor is provided in an embodiment of the present invention, where:

the processor is configured to: when it is determined that only sensor data collected by a sensor needs to be processed currently, send indication information indicating that the processor is to enter a sleep state, and enter the sleep state, where the indication information indicating that the processor is to enter the sleep state is used to enable a unit for temporarily storing sensor data to receive and temporarily store, after receiving the indication information indicating that the processor is to enter the sleep state, the sensor data collected by the sensor; and when the processor is restored to a working state, send indication information indicating that the processor is restored to the working state, where the indication information indicating that the processor is restored to the working state is used to enable the unit for temporarily storing sensor data to report the temporarily stored sensor data to the processor after receiving the indication information indicating that the processor is restored to the working state.

The receiving and temporarily storing the sensor data collected by the sensor specifically includes: receiving and temporarily storing the sensor data collected by the sensor into an event information table, recording corresponding time at which the sensor collects the sensor data, and further temporarily storing the time into the event information table; and the reporting the sensor data to the processor specifically includes: reporting the event information table to the processor.

The unit for temporarily storing sensor data may be a sensor hub, and after receiving the indication indicating that the sensor is to enter the sleep state, the sensor hub receives and temporarily stores the sensor data collected by the sensor.

That the processor sends the indication indicating that the processor is to enter the sleep state may be specifically that: the processor sends an instruction, where the instruction indicates that the processor is to enter the sleep state. The instruction may be sent by the processor to all units controlled by the processor; therefore, all these units can receive the instruction sent by the processor.

That when the processor is restored to the working state, the processor send the indication indicating that the processor is restored to the working state specifically includes that: when the processor is restored to the working state, the processor sends an instruction to notify that the processor has been restored to the working state. The instruction may be sent by the processor to all the units controlled by the processor; therefore, all these units can receive the instruction sent by the processor.

After receiving the indication indicating that the processor is restored to the working state, the sensor hub determines that the processor has been restored to the working state, and reports the event information table to the processor.

In the foregoing embodiments, the description of each embodiment has its own focus. For a part that is not described in detail in an embodiment, reference may be made to related descriptions in other embodiments. Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the spirit and scope of the technical solutions in the embodiments of the present invention.

What is claimed is:

1. A method for reporting sensor data, the method comprising:

when a processor determines that only sensor data collected by a sensor needs to be processed currently, sending, by the processor, indication information indicating that the processor is to enter a sleep state, and entering the sleep state, wherein the indication information is used to enable a sensor hub to receive and temporarily store in an event information table, after receiving the indication information, the sensor data collected by the sensor and a corresponding collection time at which the sensor collects the sensor data;

when the processor is restored to a working state, sending indication information indicating that the processor is restored to the working state, wherein the indication information is used to enable the sensor hub to report the event information table to the processor after receiving the indication information;

receiving and parsing, by the processor, the event information table reported by the sensor hub, so as to acquire the sensor data and record an acquiring time at which the processor acquires the sensor data; and calculating, according to the acquiring time using a manner of time mapping, the corresponding collection time at which the sensor collects the sensor data.

2. The method according to claim 1, wherein the processor determining that only the sensor data collected by the sensor needs to be processed currently comprises:

identifying identification information of an interaction party interacting with the processor, and when the identified identification information comprises only identification information of the sensor, determining, by the processor, that only the sensor data collected by the sensor needs to be processed currently.

3. The method according to claim 1, wherein entering, by the processor, the sleep state comprises:

disconnecting a clock and a power source of the processor.

4. The method according to claim 1, wherein the processor being restored to the working state comprises:

customizing a condition under which the sensor hub wakens the processor, and when the sensor hub determines that the wakening condition is met, wakening the processor, wherein the wakening condition comprises at least one of the following:

an amount of data in the event information table exceeds a specific value; and a duration in which the processor is in the sleep state exceeds a specific value.

5. The method according to claim 1, wherein the manner of time mapping comprises the following:

when the processor operates in a compression working state;

acquiring sensor data that is temporarily stored by the sensor hub when the processor is in the sleep state and the compression working state;

calculating a sleep duration $T_1$ from a time at which the processor enters the sleep state to a time at which the processor enters the compression working state, wherein the time at which the processor enters the sleep state is $T_{10}$;

calculating a duration $T_2$ from the time at which the processor enters the compression working state to time at which the compression working state ends, wherein the time at which the processor enters the compression working state is $T_{20}$; and adjusting a system time interface, so that when the processor acquires sensor data at acquiring time $T_{20}+\tau$, a corresponding time that is read by the system time interface and at which the sensor collects the sensor data is $T_{10}+\tau*(T_1+T_2)/T_2$, wherein $\tau$ indicates a duration variable starting from the compression working state, and when $\tau$ is the largest, the compression working state ends ($0 \leq \tau \leq T_2$).

6. A terminal, comprising:
a sensor configured to collect sensor data;
a sensor hub; and
a processor configured to:
when it is determined that only the sensor data collected by the sensor needs to be processed currently, send indication information indicating that the processor is to enter a sleep state, and enter the sleep state, and when the processor is restored to a working state, send indication information indicating that the processor is restored to the working state, and receive and parse an event information table reported by the sensor hub, so as to acquire the sensor data and record an acquiring time at which the processor acquires the sensor data;

wherein the sensor hub is connected between the sensor and the processor, and is configured to: after receiving the indication indicating that the processor is to enter the sleep state, receive and temporarily store in the event information table the sensor data collected by the sensor and a corresponding collection time at which the sensor collects the sensor data, and after receiving the indication indicating that the processor is restored to the working state, report the event information table to the processor, and wherein the processor is further configured to calculate, according to the acquiring time using a manner of time mapping, the corresponding collection time at which the sensor collects the sensor data.

7. The terminal according to claim 6, wherein the sensor hub is further configured to check whether a wakening condition of the processor is met, and if the wakening condition is met, waken the processor, so that the processor is restored from the sleep state to the working state, wherein the wakening condition comprises at least one of the following:

an amount of data temporarily stored in the event information table exceeds a specific value; and a duration in which the processor is in the sleep state exceeds a specific value.

8. The terminal according to claim 6, wherein the processor is configured to disconnect a clock and a power source of the processor to enter the sleep state.

9. The terminal according to claim 6, wherein the manner of time mapping comprises the following:

when the processor operates in a compression working state, the processor is configured to:

acquire sensor data that is temporarily stored by the sensor hub when the processor is in the sleep state and the compression working state;

calculate a sleep duration $T_1$ from a time at which the processor enters the sleep state to a time at which the processor enters the compression working state, wherein the time at which the processor enters the sleep state is $T_{10}$;

calculate a duration $T_2$ from the time at which the processor enters the compression working state to time at which the compression working state ends, wherein the time at which the processor enters the compression working state is $T_{20}$; and adjust a system time interface, so that when the processor acquires sensor data at acquiring time $T_{20}+\tau$, a corresponding time that is read by the system time interface and at which the sensor collects the sensor data is $T_{10}+\tau*(T_1+T_2)/T_2$, wherein $\tau$ indicates a duration variable starting from the compression working state, and when $\tau$ is the largest, the compression working state ends ($0 \leq \tau \leq T_2$).

* * * * *